United States Patent [19]
Lee et al.

[11] Patent Number: 6,106,919
[45] Date of Patent: Aug. 22, 2000

[54] PHASE CHANGE MEDIA COMPATIBLE WITH AIR BEARING FLYING HEAD

[75] Inventors: Neville K. S. Lee, Hong Kong, China; John S. Berg, Bellingham, Mass.; David H. P. Shieh, Hsin-chu, Taiwan

[73] Assignee: Digital Papyrus Corporation, Sunnyvale, Calif.

[21] Appl. No.: 09/061,680

[22] Filed: Apr. 16, 1998

[51] Int. Cl.[7] .................................................. B32B 3/00
[52] U.S. Cl. .................. 428/64.1; 428/64.4; 428/64.5; 428/64.6; 428/913; 430/270.13; 430/495.1; 430/945; 369/283
[58] Field of Search .................. 428/64.1, 64.2, 428/64.4, 64.5, 64.6, 688, 702, 913; 430/270.13, 495.1, 495; 369/283, 288

[56] References Cited

U.S. PATENT DOCUMENTS

| | | | |
|---|---|---|---|
| 4,237,468 | 12/1980 | Nahara et al. | 346/135.1 |
| 4,860,273 | 8/1989 | Sawano et al. | 369/100 |
| 5,202,880 | 4/1993 | Lee et al. | 369/275.4 |
| 5,242,784 | 9/1993 | Chen et al. | 430/496 |
| 5,251,193 | 10/1993 | Nelson et al. | 369/44.12 |
| 5,424,106 | 6/1995 | Yamada et al. | 428/64.1 |
| 5,470,627 | 11/1995 | Lee et al. | 428/64.4 |
| 5,585,201 | 12/1996 | Ha | 428/64.4 |

FOREIGN PATENT DOCUMENTS

| | | | |
|---|---|---|---|
| 0 410 704 A2 | 1/1991 | European Pat. Off. | G11B 7/14 |
| 6-176401 | 6/1994 | Japan | G11B 7/24 |
| WO 93/26002 | 12/1993 | WIPO | G11B 7/24 |

OTHER PUBLICATIONS

Ukita et al., "Supersmall flying optical head for phase change recording media," Applied Optics, vol. 28, No. 20, pp. 4360–4365 (Oct. 15, 1989).

*Primary Examiner*—Elizabeth Evans
*Attorney, Agent, or Firm*—Wolf, Greenfield & Sacks, P.C.

[57] ABSTRACT

An phase change optical medium compatible with a flying head can include a substrate, a reflective layer, a first dielectric layer, a phase change information carrying layer, a second dielectric layer and a lubricant layer. The structure and materials used both protect the phase change layer from mechanical damage due to impact and from information-altering heat generated by impact.

89 Claims, 3 Drawing Sheets

---

LUBRICANT 111

DIELECTRIC LAYER 109

INFORMATION CARRYING LAYER 107

DIELECTRIC LAYER 105

REFLECTIVE LAYER 103

BASE LAYER 102

SUBSTRATE 101

| LUBRICANT 111 |
| :---: |
| DIELECTRIC LAYER 109 |
| INFORMATION CARRYING LAYER 107 |
| DIELECTRIC LAYER 105 |
| REFLECTIVE LAYER 103 |
| BASE LAYER 102 |
| SUBSTRATE 101 |

*Fig. 1*

LUBRICANT 111
OVERCOAT 201

DIELECTRIC LAYER 109

INFORMATION CARRYING LAYER
107

DIELECTRIC LAYER 105

REFLECTIVE LAYER 103

BASE LAYER 102

SUBSTRATE 101

*Fig. 2*

| OVERCOAT 201 |
| :---: |
| DIELECTRIC LAYER 109 |
| INFORMATION CARRYING LAYER 107 |
| DIELECTRIC LAYER 105 |
| REFLECTIVE LAYER 103 |
| BASE LAYER 102 |
| SUBSTRATE 101 |

PHASE CHANGE MEDIA COMPATIBLE WITH AIR BEARING FLYING HEAD

FIELD OF THE INVENTION

The present invention relates generally to the field of optical recording media. More particularly, the invention relates to optical media in which information is carried in a layer of phase change material.

BACKGROUND OF THE INVENTION

There are now several different common types of optical media for storing information. The information stored on such media may include music signals, computer data, text, images, video and movies, etc. Among the common types of optical media are media based upon phase change (PC) materials.

In the context of optical recording media, PC materials are materials which can be made to exist stably at room-temperature, and within a useful operating and storage range about room temperature, in at least two distinguishable forms. For example, some PC materials can be made to exist alternatively in a stable amorphous state and in a stable crystalline state. These stable states can be distinguished using optical recording and reading apparatus, for example on the basis of differing reflectivities.

PC materials can be made to change state from one stable state to another stable state by heating them. Some such materials irreversibly change state when heated, while others change from one state to another when heated a first amount and change back when heated a second, different, amount. The heat is usually applied by a laser light source, which can also be used, at a lower output power level to detect in which state the material was most recently left. Since heat is used to change the state of the material for the purpose of recording information therein, the layer is sensitive to extremes of heat, which can cause information to be altered or lost.

In optical recording systems, such as disk drives, the recording medium, i.e. disk, is made to spin at a high speed, e.g. 3,600 RPM, while an optical system directs a laser beam onto the PC layer for reading and writing information therein. Impact or contact with the surface of such a rapidly spinning disk can generate sufficient heat to cause alteration or loss of the information recorded in the vicinity of the impact or contact. Therefore, common PC media locate the layer of PC material beneath and protected by the substrate which provides substantial mechanical support for the media. Locating the PC material in a position so that the laser must pass through the substrate affects the optical system used to focus the laser.

Disk drives for use with common PC media employ an optical system which locates the closest element to the spinning disk at a substantial, mechanically fixed distance from the disk. The mechanism which holds the closest element at the proper mechanically fixed distance from the disk is known as a non-flying head, to distinguish it from a mechanism used in connection with many magnetic and magneto-optical media known as a flying head.

A flying head maintains a substantially closer spacing from the spinning disk by using aerodynamic principals to "fly" over the surface of the disk. However, there is a substantial risk that a flying head will inadvertently contact the surface of the disk, causing information to be altered or lost. Moreover, a flying head compatible with focussing the laser through the substrate, called substrate incident operation, would not be capable of carrying a sufficiently large lens and also following perturbations of the disk surface called vertical runout. Hence, flying heads have not been used in connection with PC media. One system, disclosed by Ukita et al. in "Supersmall flying optical head for phase change recording media," Applied Optics, Vol. 28, No. 20, Oct. 15, 1989, employs a flying head which does not focus the laser through the substrate, called air incident operation. However, this head is made to fly at a height of a few micrometers, stated to be ten times greater than the flying height of a magnetic head. The medium used, however, is substantially unprotected from impacts by the head.

SUMMARY OF THE INVENTION

It is an object of the present invention to provide an improved phase change medium compatible with a flying head. Other objects of the invention and features of embodiments thereof will be apparent to those skilled in this art upon reading this description.

According to one embodiment of the invention, there is a recording medium including a phase change layer in which information is recorded and a protective layer including a lubricant layer dissipative of heat. According to another embodiment, there is a recording medium comprising: a substrate; a phase change layer in which information is recorded; and a heat dissipating lubricant layer. Finally, there is, according to yet another embodiment of the invention, a recording medium comprising: a phase change layer in which information is recorded; and a lubricant layer compatible with a flying head disposed on the phase change layer.

BRIEF DESCRIPTION OF THE DRAWING

In the drawing, in which like reference designations indicate like elements:

FIG. 1 is a schematic representation of the structure of an embodiment of a recording medium in accordance with various options and aspects of the invention;

FIG. 2 is a schematic representation of another embodiment of a recording medium in accordance with various options and aspects of the invention; and FIG. 3 is a schematic representation of yet another embodiment of a recording medium in accordance with various options and aspects of the invention.

DETAILED DESCRIPTION

The present invention will be better understood upon reading the following detailed description of some embodiments thereof, in conjunction with the accompanying drawing.

Referring now to FIG. 1, one embodiment is now briefly described. The medium is constructed on a substrate 101 of a mechanically sound material. The layers of the medium (including some optional layers discussed below), in the order in which they are disposed on the substrate 101, include an optional base layer 102, an optional reflective layer 103, a first dielectric layer 105, a phase change layer 107 also referred to as the information carrying layer 107, a second dielectric layer 109 and a lubrication layer 111. The layers may be disposed on both sides of substrate 101, in mirror-image relationship to each other, to form a two-sided recording medium. The disk drive for use with this medium includes a laser light source having a wavelength ($\lambda$) in air of 680 nm. Lasers typically used with phase change media have wavelengths of 625 nm<$\lambda$<685 nm, although wavelengths outside this range could be used with properly designed media. The desired properties and physical characteristics of the layers is now discussed in greater detail.

The information carrying layer 107 may be constructed of any one of a variety of known PC materials, such as the alloy of germanium, antimony and tellurium: $Ge_{21}Sb_{26}Te_{53}$. The material chosen for the illustrative embodiment is rewritable, but write-once and read-only materials can also be used, as well as other rewritable materials. The materials chosen for the illustrative embodiment is an alloy of metals, but could also include such other elements or compounds as may be found to be useful in PC thin films. In this embodiment, the PC layer 107 is 20 nm thick.

The information carrying layer 107 is protected above and below by dielectric layers 105, 109, which serve a number of useful purposes. The dielectric layers 105, 109 provide some mechanical protection for the information carrying layer 107, as well as efficiently dissipating heat. Heat is generated in the information carrying layer 107 when writing, i.e., intentionally altering the information recorded therein. However, heat generated at a location desired to be written can dissipate through the information carrying layer 107, altering adjacent locations, unless carried away efficiently, for example by the dielectric layers 105, 109. Good materials for dielectric layers 105, 109 include SiN, a mostly amorphous mixture of ZnS with $SiO_2$, a diamond-like coating, amorphous carbon or a thin film diamond layer. Some of these materials are amorphous solids, while others are single- or multi-crystalline solids. The amorphous materials exhibit excellent mechanical toughness, while the crystalline materials exhibit high thermal conductivity and high light transmissivity. Particularly useful material choices include amorphous $SiN_x$ or the mixture of ZnS with $SiO_2$, or single-crystal diamond or diamond like material. A compound dielectric layer 109 can be used, having a base of ZnS mixed with $SiO_2$ on which $SiN_x$ or $SiO_2$ is disposed.

Since the second dielectric layer 109 which is located above the information carrying layer 107 should be transparent, or nearly so, at the wavelength $\lambda_n$ in the dielectric of operation of the laser used in the disk drive, the second dielectric layer 109 should preferably be about $\frac{1}{4}\lambda_n$ in thickness. Thus, in the embodiment of FIG. 1, the second dielectric layer 109 is about 120 nm thick.

In contrast, the first dielectric layer 105, located below the information carrying layer 107, serves primarily to support and protect the information carrying layer 107. Being below the information carrying layer 107, the first dielectric layer 105 need not be as thick. Thus, in the illustrative embodiment, the first dielectric layer 105 is about 50 nm thick. Using a thickness which differs (either greater than or less than) significantly from a thickness of about $\frac{1}{4}\lambda_n$ serves another useful purpose because such a layer will tend to be highly reflective. With the right choice of materials and thicknesses for the first dielectric layer 105, the reflective layer 103 can be omitted, with the first dielectric layer 105 serving also as a reflective layer.

Turning now to reflective layer 103, if it is used, this layer is preferably a metal layer, although it can also be a dielectric reflector. An 80 nm thick film of a metal, such as aluminum, which adheres well to the substrate material is a good choice.

If the metal selected for the reflective layer 103 is one which does not adhere well to the substrate material, an additional optional base layer 102 can be used. The base layer 102 is selected to be compatible with both the metal reflective layer 103 (or the dielectric layer 105, if the reflective layer is omitted) and the substrate 101. For example, for a polycarbonate or ceramic substrate 101, chromium and silicon are good base layer materials, while silicon works well with glass substrates, as well. Aluminum oxide, silicon dioxide and a mixture of ZnS with $SiO_2$ also make good base layers. The base layer aids in adhesion of the structure to the substrate 101 while also improving the capacity of the structure to effectively dissipate unwanted heat.

The top layer of the embodiment of FIG. 1 is a lubrication layer 111. The lubrication layer 111 should preferably be of a material that has an ability to locally dissipate high energy, such as generated by an impact of a flying head with the medium surface. One material known to possess such a property is cyclic phosphazene (Dow Chemical), which is applied in a monomolecular or nearly monomolecular layer of about 5–20 Å, so as to be optically negligible in thickness. Other useful lubricants include phosphazene groups, diamond, diamond-like carbon and amorphous carbon. The lubricant, in combination with the suggested dielectric materials provides a medium surface with a low coefficient of friction (reducing the energy of impact which must be dissipated), a high thermal conductivity (so as to dissipate heat efficiently, including the heat of impact with the medium surface) and of a proper optical thickness so that a flying head and conventional laser sources can be used.

The substrate 101 can be polycarbonate, other hydrocarbon polymers including opaque formulations, glass, metal or ceramic. There is no requirement that the substrate be transparent, as in substrate incident media, because as an air incident medium, the medium of this embodiment does not require the laser to pass through the substrate.

Each layer of the illustrative embodiment is applied to the structure assembled on the substrate 101 by one of the known techniques for applying a thin film of the particular material. Such techniques may include, but are not limited to sputtering, vapor deposition, plating and spin coating.

As shown in FIG. 2, another embodiment adds to the structure of FIG. 1 an overcoat 201, disposed between the dielectric layer 109 and the lubricant 111. As described above, the dielectric layer 109 can be a compound layer of $SiN_x$ or $SiO_2$ on a base of a mixture of ZnS and $SiO_2$. The lubricant can be any of the liquid or solid lubricants mentioned above, including chromium, silicon, aluminum oxide, silicon dioxide and a mixture of ZnS with $SiO_2$. The overcoat 201 is preferably a hard, durable, thin layer of one of the solid dielectric or lubricant materials including $SiN_x$, $SiO_2$, diamond-like carbon, diamond or amorphous carbon.

As shown in FIG. 3, when an overcoat 201 is supplied which in combination with the rest of the structure provides suitable protection and heat dissipation characteristics for the information carrying layer 107, the lubricant layer 111 may be omitted.

An advantageous arrangement of any of the foregoing embodiments is one in which the thicknesses of the layers on the information carrying layer, i.e., those through which the laser travels, combine to give an optical path length equivalent to $\lambda/4$ in free space. That is, the sum of the thicknesses expressed in units of $\lambda_n$ for each material is $\lambda_n/4$.

Also advantageous is the construction of two-sided media employing the principles of the present invention, as briefly mentioned, above. One substrate 101 may be coated on both sides using conventional techniques. Two thinner substrates 101 may be each coated on one side and the two substrates 101 then bonded together to form a single medium. Alternatively, two very thin substrates 101 may each be coated on one side and then bonded to a thick, central substrate (not shown) of any useful material, which need not be compatible with the process for forming the layers or transparent. Finally, one coated substrate 101 as described above can be bonded to a standard DVD-ROM, rewritable DVD or CD-ROM, providing a greater variety of interchange options.

Having now described a few embodiments of the invention, it should be apparent to those skilled in the part that the foregoing is merely illustrative and not limiting, having been presented by way of example only. Numerous modifications and other embodiments are within the scope of one of ordinary skill in the art and are contemplated as falling within the scope of the invention as defined by the appended claims and equivalents thereto.

What is claimed is:

1. A recording medium comprising in a layered structure in the order recited:
    a substrate;
    a first dielectric layer;
    a phase change layer in which information is stored;
    a second dielectric layer; and
    a lubricant layer.

2. The recording medium of claim 1, wherein the lubricant layer is dissipative of heat.

3. The recording medium of claim 2 in which the phase change layer is rewritable.

4. The recording medium of claim 2 in which the phase change layer is an alloy of GeSbTe.

5. The recording medium of claim 4 in which the alloy is $Ge_{21}Sb_{26}Te_{53}$.

6. The recording medium of claim 2, wherein the protective layer includes a layer of dielectric material.

7. The recording medium of claim 6, for use with a laser light source having a wavelength in the protective layer of $\lambda_n$, wherein the protective layer has a thickness of $\frac{1}{4}\lambda_n$.

8. The recording medium of claim 6, wherein the protective layer is made of at least one of the group of $SiN_x$, ZnS and $SiN_x$ on a base of one of ZnS and a mixture of ZnS and $SiO_2$.

9. The recording medium of claim 2, wherein the protective layer includes a layer of a single crystal material.

10. The recording medium of claim 2, wherein the protective layer includes a layer of a diamond structured carbon.

11. The recording material of claim 2, wherein the protective layer includes a layer having a diamond-like structure.

12. The recording medium of claim 2, wherein the lubricant layer is made of a material that dissipates heat generated by an impact therewith.

13. A recording medium including a phase change layer in which information is recorded and a protective layer including a lubricant layer dissipative of heat, including heat generated by an impact therewith, wherein the lubricant layer is a monomolecular layer.

14. The recording medium of claim 13, wherein the lubricant layer is cyclic phosphazene.

15. The recording medium of claim 2, further comprising a reflective layer, wherein the phase change layer is disposed on the reflective layer.

16. The recording medium of claim 15, wherein the reflective layer is made of a metal.

17. The recording medium of claim 16, wherein the metal is aluminum.

18. The recording medium of claim 15, wherein the reflective layer is made of a dielectric material.

19. The recording medium of claim 18, for use with a laser light source having a wavelength in the dielectric reflective layer of $\lambda_n$, wherein the dielectric reflective layer has a thickness greater than $\frac{1}{4}\lambda_n$.

20. The recording medium of claim 18, for use with a laser light source having a wavelength in the dielectric reflective layer of $\lambda_n$, wherein the dielectric reflective layer has a thickness less than $\frac{1}{4}\lambda_n$.

21. The recording medium of claim 18, wherein the dielectric reflective layer is made from at least one of the group of $SiN_x$, ZnS and $SiN_x$ on a base of one of ZnS and a mixture of ZnS and $SiO_2$.

22. The recording medium of claim 2, wherein the phase change layer and protective layer are disposed on a substrate made from one of the group of a polycarbonate, a hydrocarbon polymer, a glass, a metal and a ceramic.

23. The recording medium of claim 22, further comprising a base layer disposed between the substrate and the phase change layer.

24. The recording medium of claim 23, wherein the base layer is chromium.

25. The recording medium of claim 23, wherein the base layer is silicon.

26. The recording medium of claim 23, wherein the base layer is aluminum oxide.

27. The recording medium of claim 23, wherein the base layer is $SiO_2$.

28. The recording medium of claim 23, wherein the base layer is a mixture of ZnS and $SiO_2$.

29. A recording medium comprising in a layered structure in the order recited:
    a substrate;
    a first dielectric layer;
    a phase change layer in which information is stored;
    a second dielectric layer;
    a lubricant layer; and
    an overcoat of a protective material.

30. The recording medium of claim 29, wherein the lubricant layer comprises:
    a heat dissipating lubricant layer.

31. The recording medium of claim 30 in which the phase change layer is rewritable.

32. The recording medium of claim 30 in which the phase change layer is an alloy of GeSbTe.

33. The recording medium of claim 32 in which the alloy is $Ge_{21}Sb_{26}Te_{53}$.

34. The recording medium of claim 30, further comprising a heat dissipative layer of a dielectric material.

35. The recording medium of claim 34, for use with a laser light source having a wavelength in the heat dissipative layer of $\lambda_n$, wherein the heat dissipative layer has a thickness of $\frac{1}{4}\lambda_n$.

36. The recording medium of claim 34, wherein the heat dissipative layer is made of at least one of the group of $SiN_x$, ZnS and $SiN_x$ on a base of one of ZnS and a mixture of ZnS and $SiO_2$.

37. The recording medium of claim 30, wherein the heat dissipative layer includes a layer of a single crystal material.

38. The recording medium of claim 30, wherein the heat dissipative layer includes a layer of a diamond structured carbon.

39. The recording material of claim 30, wherein the heat dissipative layer includes a layer of a diamond-like structure.

40. The recording medium of claim 30, wherein the lubricant layer is made of a material that dissipates heat generated by an impact therewith.

41. A recording medium comprising:
    a substrate;
    a phase change layer in which information is recorded; and
    a heat dissipating lubricant layer,
    wherein the lubricant layer dissipates heat generated by an impact therewith, and
    wherein the lubricant layer is a monomolecular layer.

42. The recording medium of claim 41, wherein the lubricant layer is cyclic phosphazene.

43. The recording medium of claim 30, further comprising a reflective layer, wherein the phase change layer is disposed on the reflective layer.

44. The recording medium of claim 43, wherein the reflective layer is made of a metal.

45. The recording medium of claim 44, wherein the metal is aluminum.

46. The recording medium of claim 43, wherein the reflective layer is made of a dielectric material.

47. The recording medium of claim 46, for use with a laser light source having a wavelength in the dielectric reflective layer of $\lambda_n$, wherein the dielectric reflective layer has a thickness greater than $\frac{1}{4}\lambda_n$.

48. The recording medium of claim 46, for use with a laser light source having a wavelength in the dielectric reflective layer of $\lambda_n$, wherein the dielectric reflective layer has a thickness less than $\frac{1}{4}\lambda_n$.

49. The recording medium of claim 46, wherein the dielectric reflective layer is made from at least one of the group of $SiN_x$, ZnS and $SiN_x$ on a base of one of ZnS and a mixture of ZnS and $SiO_2$.

50. The recording medium of claim 30, wherein the substrate is made of one of the group of a polycarbonate, a hydrocarbon polymer, a glass, a metal and a ceramic.

51. The recording medium of claim 50, further comprising a base layer disposed between the substrate and the phase change layer.

52. The recording medium of claim 51, wherein the base layer is chromium.

53. The recording medium of claim 51, wherein the base layer is silicon.

54. The recording medium of claim 51, wherein the base layer is aluminum oxide.

55. The recording medium of claim 51, wherein the base layer is $SiO_2$.

56. The recording medium of claim 51, wherein the base layer is a mixture of ZnS and $SiO_2$.

57. The recording medium of claim 1, wherein the lubricant layer is compatible with a flying head.

58. The recording medium of claim 57 in which the phase change layer is rewritable.

59. The recording medium of claim 57 in which the phase change layer is an alloy of GeSbTe.

60. The recording medium of claim 59 in which the alloy is $Ge_{21}Sb_{26}Te_{53}$.

61. The recording medium of claim 57, further comprising a protective layer disposed between the phase change layer and the lubricant layer, the protective layer including a dielectric material.

62. The recording medium of claim 61, for use with a laser light source having a wavelength in the protective layer of $\lambda_n$, wherein the protective layer has a thickness of $\frac{1}{4}\lambda_n$.

63. The recording medium of claim 61, wherein the protective layer is made of at least one of the group of $SiN_x$, ZnS and $SiN_x$ on a base of one of ZnS and a mixture of ZnS and $SiO_2$.

64. The recording medium of claim 57, wherein the protective layer includes a layer of a single crystal material.

65. The recording medium of claim 57, wherein the protective layer includes a layer of diamond structured carbon.

66. The recording material of claim 57, wherein the protective layer includes a layer of a diamond-like structure.

67. The recording medium of claim 57, wherein the lubricant layer is made of a material that dissipates heat generated by an impact therewith.

68. A recording medium comprising:
    a phase change layer in which information is recorded; and
    a lubricant layer compatible with a flying head disposed on the phase change layer,
    wherein the lubricant layer dissipates heat generated by an impact therewith, and
    wherein the lubricant layer is a monomolecular layer.

69. The recording medium of claim 68, wherein the lubricant layer is cyclic phosphazene.

70. The recording medium of claim 57, further comprising a reflective layer, wherein the phase change layer is disposed on the reflective layer.

71. The recording medium of claim 70, wherein the reflective layer is made of a metal.

72. The recording medium of claim 71, wherein the metal is aluminum.

73. The recording medium of claim 70, wherein the reflective layer is made of a dielectric material.

74. The recording medium of claim 73, for use with a laser light source having a wavelength in the dielectric reflective layer of $\lambda_n$, wherein the dielectric reflective layer has a thickness greater than $\frac{1}{4}\lambda_n$.

75. The recording medium of claim 73, for use with a laser light source having a wavelength in the dielectric reflective layer of $\lambda_n$, wherein the dielectric reflective layer has a thickness less than $\frac{1}{4}\lambda_n$.

76. The recording medium of claim 73, wherein the dielectric reflective layer is made from at least one of the group of $SiN_x$, ZnS and $SiN_x$ on a base of one of ZnS and a mixture of ZnS and $SiO_2$.

77. The recording medium of claim 57, wherein the phase change layer and protective layer are disposed on a substrate made from one of the group of a polycarbonate, a hydrocarbon polymer, a glass, a metal and a ceramic.

78. The recording medium of claim 77, further comprising a base layer disposed between the substrate and the phase change layer.

79. The recording medium of claim 78, wherein the base layer is chromium.

80. The recording medium of claim 78, wherein the base layer is silicon.

81. The recording medium of claim 78, wherein the base layer is aluminum oxide.

82. The recording medium of claim 78, wherein the base layer is $SiO_2$.

83. The recording medium of claim 78, wherein the base layer is a mixture of ZnS and $SiO_2$.

84. A recording medium comprising in a layered structure in the order recited:
    a substrate;
    a first dielectric layer;
    a phase change layer in which information is stored;
    a second dielectric layer; and
    an overcoat of a protective material.

85. The recording medium of claim 1, used with a laser light source, wherein the laser light source has a wavelength in the lubricant layer of $\lambda_n$ and the lubricant layer has a thickness of $\leq \frac{1}{4}\lambda_n$.

86. A two-sided recording medium, comprising on a first side of a substrate, in a layered structure in the order recited:
    a substrate;
    a first dielectric layer;
    a phase change layer in which information is stored;
    a second dielectric layer; and
    a lubricant layer.

87. The medium of claim 86, further comprising on a second side of the substrate, in a layered structure in the order recited:
    a phase change layer in which information is stored; and
    a protective layer, wherein the laser light source has a wavelength in the protective layer of $\lambda_n$ and the protective layer has a thickness of $\leq \frac{1}{4}\lambda_n$.

88. The medium of claim 86, further comprising a DVD bonded to a second side of the substrate.

89. The medium of claim 86, further comprising a CD bonded to a second side of the substrate.

* * * * *